United States Patent [19]

Bond

[11] Patent Number: 4,558,179
[45] Date of Patent: Dec. 10, 1985

[54] MESSAGE PLAYBACK CONTROL SYSTEM FOR TELEPHONE ANSWERING MACHINE

[75] Inventor: Raymond G. Bond, Long Beach, Calif.

[73] Assignee: T.A.D. Avanti, Inc., Compton, Calif.

[21] Appl. No.: 527,978

[22] Filed: Aug. 31, 1983

[51] Int. Cl.$^4$ ................... H04M 1/64; G11B 15/00
[52] U.S. Cl. .................. 179/6.03; 179/6.07; 360/74.1
[58] Field of Search ............. 179/6.03, 6.01, 6.13, 179/6.07; 360/55, 69, 71, 74.1, 74.4; 369/27, 47

[56] References Cited

U.S. PATENT DOCUMENTS

| | | | |
|---|---|---|---|
| 4,390,751 | 6/1983 | Jacobson | 179/6.07 |
| 4,400,586 | 8/1983 | Hanscom | 360/74.1 X |
| 4,402,019 | 8/1983 | Takagi et al. | 360/74.1 X |

FOREIGN PATENT DOCUMENTS 141506 12/1978 Japan .................... 179/6.07

Primary Examiner—Robert L. Richardson
Attorney, Agent, or Firm—Keith D. Beecher

[57] ABSTRACT

A message playback control system for a telephone answering machine of the type in which a user, in order to recover his messages, by operation of a manually operated local switch, causes the message tape in the machine to rewind to a particular position, and then causes the message tape to move in the forward direction and play back the messages recorded on the tape. The control system of the invention automatically causes the message tape to stop when all the messages have been played back, and then returns the machine to the automatic answer condition ready to answer the next telephone call.

5 Claims, 2 Drawing Figures

MESSAGE PLAYBACK CONTROL SYSTEM FOR TELEPHONE ANSWERING MACHINE

BACKGROUND OF THE INVENTION

In the prior art machines, the user has no way of knowing when the current messages have ended during an operation in which he causes the message tape to rewind, and then to move in the forward direction, so that he can retrieve the messages recorded on the message tape. This is because, when the message tape is set to playback, it will continue to reproduce all current messages, and will continue to move in the forward direction after the current messages have all been reproduced. This continued forward movement of the message tape often results in previous unerased messages to be reproduced. This can cause confusion to the user, since it is often difficult to distinguish between current and previous messages.

The problem described in the preceding paragraph is solved by the control system of the present invention in which the message tape is rewound by the operation of a local switch, which causes the message tape to move forward to play back the recorded messages, and which automatically causes the forward motion of the message tape to stop after the user has retrieved all current messages recorded on the message tape, and returns the machine to its automatic answer condition ready to answer the next call. This is achieved in the machine to be described by a microcomputer which senses the amolunt of message tape rewound when a rewind operation is initiated by operation of the manual switch, and then automatically causes the message tape to stop when it again reaches the point at which the rewind was initiated during the ensuing playback operation. Alternate implementations are to remember the tape position by reading the current tape position from a code on the tape or by recording a tone or tones which will be recognized when played back at the original position.

As noted above, the control system returns the machine to its automatic answer condition after the message tape has been automatically stopped. Should the user wish to retain the messages on the message tape, no further operation on his part is necessary. However, if the user does not wish to retain the messages on the message tape, he merely causes the message tape to rewind to a selected origin position.

DETAILED DESCRIPTION OF THE ILLUSTRATED EMBODIMENT

Figure 1:
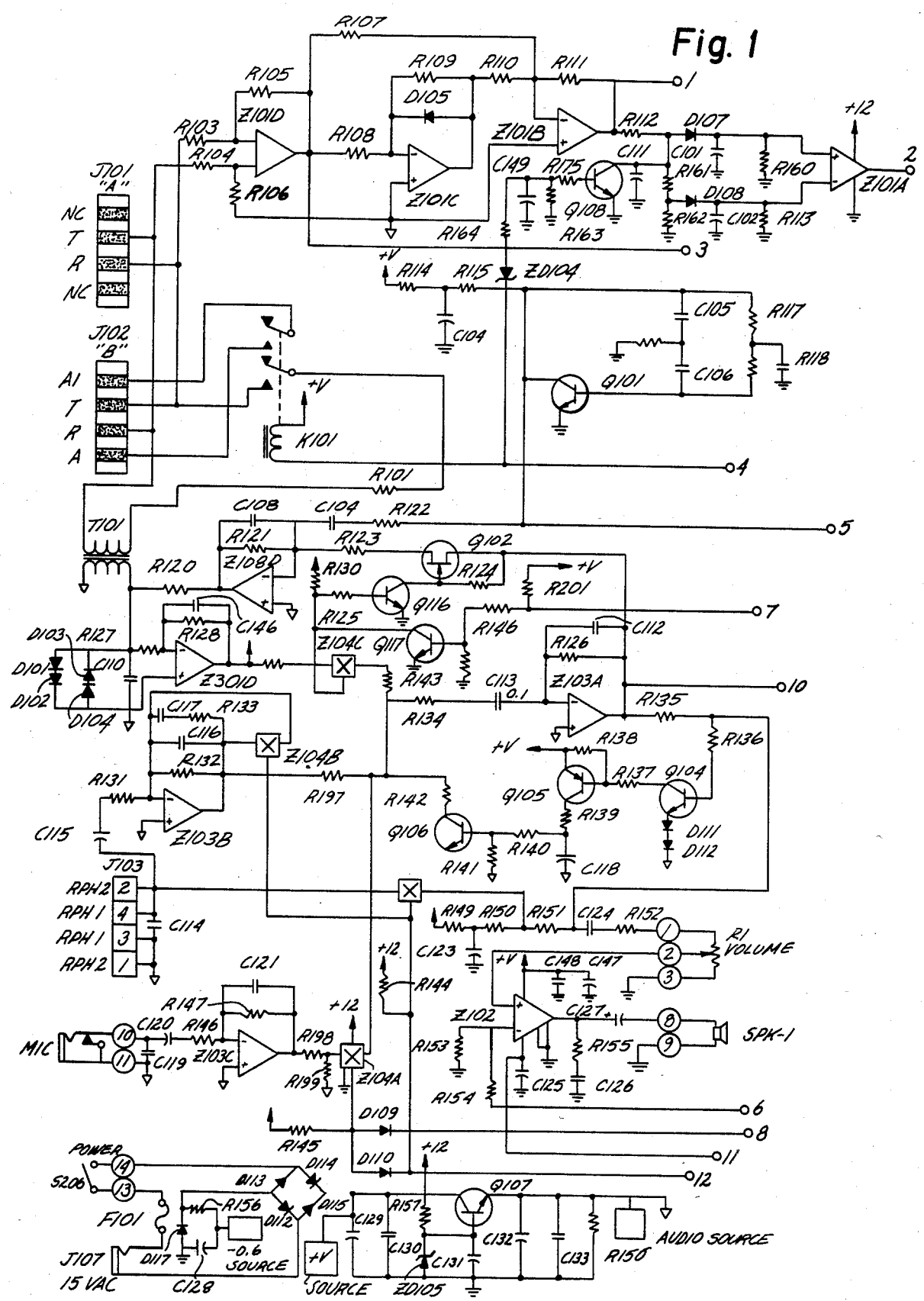
FIGS. 1 and 2 are representations of a schematic circuit diagram of a telephone answering machine incorporating the remote control system of the present invention. In the drawing, all resistor values are in ohms, and all capacitor values are in microfarads, unless otherwise designated.
Figure 2:
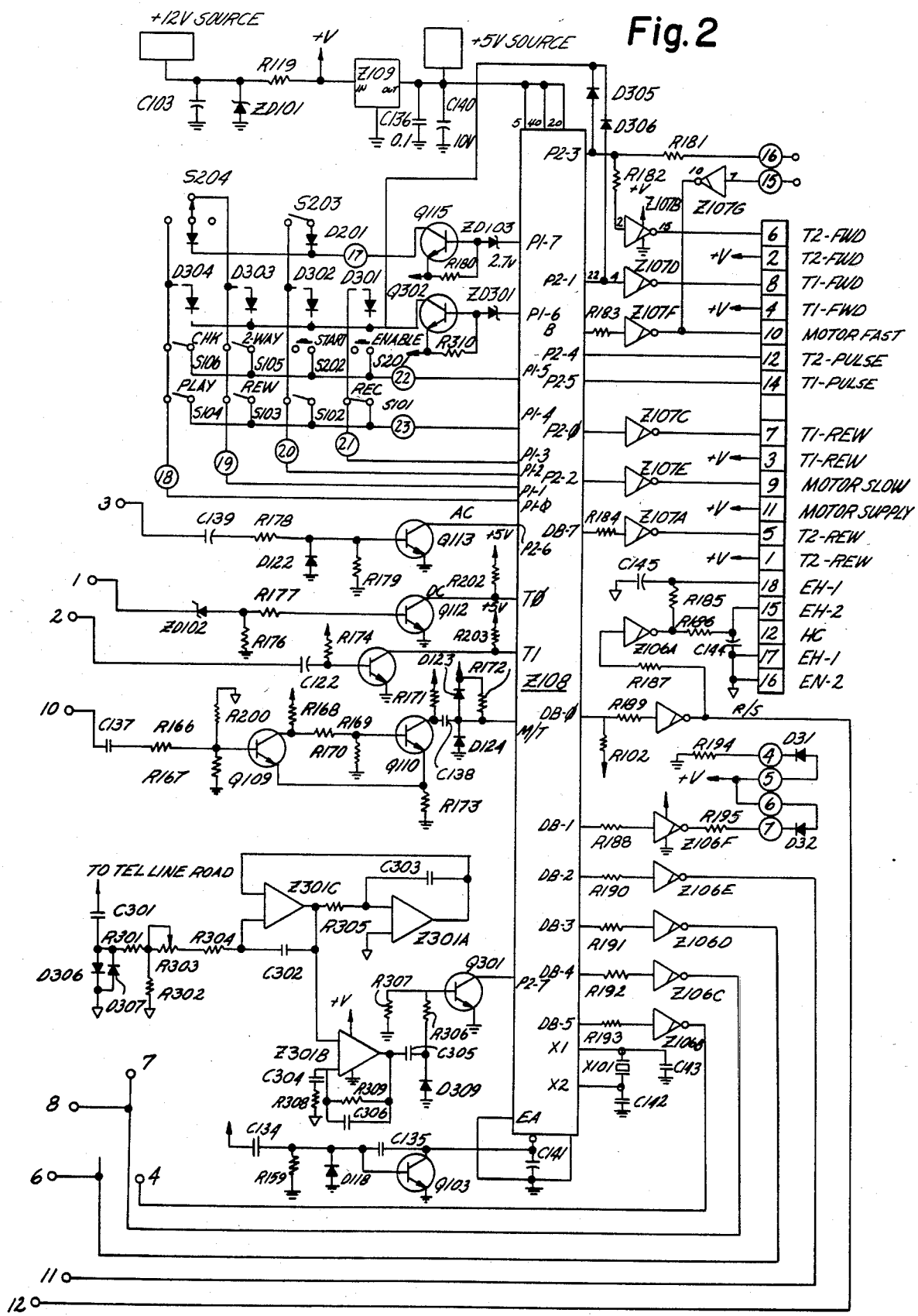

The system shown in FIGS. 1 and 2 includes a microcomputer Z108 which may be of the type manufactured and sold by National Semiconductor Company, and which is designated by them as INS8048. The system also includes a connector J102 which has terminals 3 and 4 connected to the tip and ring terminals of the telephone line. Line seizure is effectuated by a relay K101. The system is coupled to the telephone line through a transformer T101. The outgoing audio signals corresponding to the announcement transmitted by the system during the announcment interval ($T_1$) is amplified by an amplifier Z103D. The incoming audio signals to be recorded during the message interval ($T_2$) are amplified by an amplifier Z103A. A connector J103 is connected to the record and reproduce head RPH2 associated with the T-2 message tape, and to the record and reproduce head RPH1 associated with the T-1 announcement tape.

The incoming audio signals representing the message to be recorded are passed through transformer T101 and through a bilaterial analog switch Z104C to amplifier Z103A, and through a bilateral analog switch Z104D to the record/reproduce head RPH2 to be recorded on the message tape T-2. Resistors R149, R150 and R151, together with grounded capacitor C123 provide a bias circuit for the head. An automatic gain control circuit for amplifier Z103A is provided by transistors Q104, Q105 and Q106. The announcement recorded on the announcement tape T-1 is amplified by amplifier Z103B, and through amplifier Z103A and amplifier Z103D to transformer T101 for application to the telephone line.

The ring signal for the telephone answering system is initiated when a ring signal occurs at the tip (T) and ring (R) terminals of connector J102. The ring signal is fed to an operational amplifier Z101D. The alternating current signal output of amplifier Z101D is fed to port P2-6 of microcomputer Z108, by way of a differentiator circuit formed by capacitor C139, resistor R178, diode D122, resistor R179 and transistor Q113.

The microcomputer Z108 decides whether or not the alternating current output of amplifier Z101D is of proper duration (400 milliseconds) and frequency (16–68 Hz), and if so activates the T-1 announcement tape when the ring signal count matches the count set by the ring select switch S203. Ring select switch S203 can be set to cause the system to respond to a selected number of rings before activation, according to the setting of the switch. However, if during a previous $T_2$ message record mode T2 pulses are not received at port P2-4 of the microcomputer, this is an indication that the T-2 message tape has broken or is full. If that occurs, the microcomputer ignores the setting or ring select switch for all future calls and cause the machine to answer only after a large number of rings (i.e. 10) are received.

When the microcomputer Z108 recognizes the present ring count, or the larger ring count, it initiates a T-1 cycle. The T-1 cycle activates the T-1 announcement tape, causes the system to go off hook, and plays the announcement recorded on the announcement tape over the telephone line. For this purpose, microcomputer Z108 activates port P2-2 which turns on a motor (M1) at its regulated speed (motor slow) by way of driver Z107E, and terminal J105-9. Port P2-1 of the microcomputer is turned on at this time to activate the T-1 forward solenoid. This action in conjunction with the activation of motor M1 pulls in the T-1 head plate and starts the T-1 tape moving. At the same time, port DB-5 of the microcomputer Z108 goes high (1), and its output is fed to an inverting amplifier driver Z106B, whose output $\overline{LS}$ is at ground potential. This activates relay K101 which puts transformer T101 and resistor R101 across the tip and ring terminals of strip J102, providing a line seize (off-hook) condition. Port DB-4 of the microcomputer is low (0) at this time, and its output is inverted by inverter Z106C providing high (1) potential at its output (T/$\overline{R}$). This potential is fed to the base of transistor Q117 to render the transistor conductive. When transistor Q117 is conductive, it causes the bistable analog switch Z104C to be biased off by way of resistor R130.

Audio signals corresponding to the audio announcement recorded on the moving T-1 tape are picked up by record head RP-1 and fed by way of capacitor C115 and resistor R113 to amplifier Z103B. The audio signals are amplified by a gain of approximately 200, and fed to amplifier Z103A by way of resistors R197 and R134, and capacitor C113. The audio signals are amplified in amplifier Z103A by a gain of approximately 100, and is fed to field effect transistor (FET) Q102 which is biased to its conductive state by resistor R124. So long as transistor Q116 is non-conductive, the announcement audio signals are passed through FET Q102 to amplifier Z103D, from which they are fed to the line transformer T101. The line transformer transmits the outgoing audio announcement signals to the telephone line.

The audio output from Z103A is also fed to a Schmitt trigger formed of transistors Q109 and Q110 by way of capacitor C137 and resistor R166. The squared audio signal from the collector of Q110 is fed to a differentiator circuit formed by capacitor C138 and resistor R172. The resulting negative-going spikes are interrogated by microcomputer Z108 by way of port $\overline{INT}$ to detect a beep tone (1530 Hz–2070 Hz) which is recorded on the T-1 announcement tape, and which signals the end of the T-1 announcement. When the beep tone recorded on the T-1 tape is recognized, the microcomputer turns off port P2-1 which releases the T-1 forward solenoid. This action causes the T-1 head plate to retract, and stops the T-1 tape.

The message recording cycle ($T_2$) begins when the beep tone on the announcement tape (T-1) is recognized by the microcomputer Z108. When the message recording cycle ($T_2$) begins, the message tape T-2 is activated to permit the recording of the message received from the calling party over the telephone line for the length of the time specified by the setting of the message time switch S204. In the "none" position the message recording cycle ($T_2$) shuts off immediately. When the switch S204 is in the "fix" position, the message received over the telephone line may be recorded for a fixed interval of time, after which the machine will automatically shut off. When the switch S204 is in the "VOX" position, the message received over the telephone line will continue to be recorded on the message tape T-2 for so long as the calling party continues to talk, up to the capabilities of the message tape. Specifically, the machine will continue to record the message until there is a 7 second break in the audio signal, or a dial tone is encountered, or a busy is encountered, or a pulse due to the calling party hanging up occurs.

The VOX interrogation of the incoming audio signal is controlled by the microcomputer Z108. The external circuitry necessary for this function is a Schmitt trigger formed by transistors Q109 and Q110 which digitizes the audio information. Once the microcomputer has determined that no audio is present, or that a spurious audio signal is present, the microcomputer will output a beep tone to the tape heads and to the telephone line by actuating a beep oscillator circuit associated with transistor Q101. The T-2 message tape will now rewind an amount corresponding to the 7 second time-out, and the T-2 tape will then be disengaged. The system will then transfer to the T-1 announcement tape, and rewind the T-1 announcement tape to its origin position, and await the next call.

When the beep tone recorded on the T-1 announcement tape is recognized by the microcomputer Z108, its sets the port P2-1 low (0) which disengages the T-1 forward solenoid. The motor (M1) remains on by way of port P2-2. Port P2-3 is then made high (1), and its output, after inversion by inverter Z107B energizes the T-2 play solenoid. This action, in conjunction with the activation of motor M1 engages the T-2 head plate causing the T-2 message tape to move in the forward direction. The system now enters its $T_2$ cycle, during which port DB-5 remains high (1) maintaining line seizure.

The audio signals from the telephone line are fed into the system when the microcomputer Z108 causes port DB-4 to go high (1), the output being inverted by inverter Z106C causing its output T/R to go low (0). When T/R goes low, Q117 becomes non-conductive to allow voltage from resistor R130 to turn on analog switch Z104C. When switch Z104C is turned on, it permits the audio signal from the telephone line to be passed to amplifier Z103A by way of transformer T101, R127, R129, Z104C, Z143, R134 and C113. Amplifier Z103 feeds audio signals to the heads RPH2 of the T-2 message tape by way of resistors R135 and R151, analog switch Z104D and connector J103-2. Resistors R149 and R150, and capacitor C123 provide a 6 volt DC bias to transistor Q106. Analog switch Z104D is turned on at this time by the microcomputer Z108 causing port DB-0 to go low (0), and output R/$\overline{P}$ to go high (1), so that audio may be applied to the T-2 heads RPH2. The amplifier Z103B is disabled at this time, because analog switch Z104B is also turned on.

At the end of the $T_2$ message recording interval, port P2-3 goes low releasing the T-2 head tape. Port P2-0 will then go high (1) activating the announcement T-1 rewind solenoid. This causes the announcement tape T-1 to rewind to its origin position. When that position is reached, no more T1 pulses are received at port P2-5 and the microcomputer terminates the rewind operation and sets the system in condition to receive the next call.

In this manner, successive messages are recorded on the message tape $T_2$. In order to retrieve his messages, the user closes the "REW" switch. This causes port DB-7 of microcomputer Z108 to go high (1) causing the T-2 rewind solenoid to be energized to activate the rewind mechanism and rewind the T-2 tape back, either to its beginning position, or some other origin position that is stored in the microcomputer. When the user then closes the "PLAY" switch and opens the "REW" switch, the rewind and play switches can be combined into a single "Message Recover" switch in which the rewind and playback will be done automatically under the control of the microcomputer, port DB-7 goes low (0) de-energizing the T-2 rewind solenoid, and port P2-3 goes high (1) to activate the T-2 forward solenoid and start the T-2 message tape moving in its forward direction. Audio information is now fed from the T-2 record/reproduce head (RPH2) through J103 to preamplifier Z103B, and then to amplifier Z103A by way of resistor R197, resistor R134 and capacitor C113. Amplifier Z103A feeds the audio information from the T-2 message tape and through amplifier Z102 to speaker SPK-1. The message recorded on the message tape T-2 are then reproduced by the speaker at a volume established by the setting of potentiometer R1.

After all the messages recorded on the T-2 tape have been reproduced by the speaker, the microcomputer Z108 senses the fact that the message tape has returned to the point at which rewind was initiated and stops the T-2 message tape. This control is achieved by feeding pulses into port P2-4 from a T-2 pulse switch whenever the message tape T-2 is moving. The microcomputer counts these pulses and stores them in memory. When the pulses fed from J105-13 into port P2-4 match the number that are set in memory, the programming of the microcomputer determines that this signifies the end of the messages recorded on the T-2 message tape, and will cause the tape to stop.

The microcomputer stops the T-2 message tape by causing the P2-3 port to go low (0) so as to deactivate the T-2 forward solenoid. The microcomputer will then rewind the T1 announcement tape by causing port P2-0 to go high (1) which turns on the T-1 rewind solenoid. The T-1 solenoid rewinds until T-1 pulses at port P2-5 stop signifying that the beginning of the T1 announcement tape has been reached. When the T1 announcement tape reaches its beginning, the machine is again ready to answer any subsequent calls received over the telephone line.

As mentioned above, if the messages on the T-2 message tape are not to be saved, the user closes the "REW" switch, causing the message tape to rewind to a predetermined origin position. During the rewind operation, the messages on the T-2 message tape can be erased because the T-2 erase head (EH2) is activated.

The invention provides, therefore, a message playback control system for a telephone machine in which the microcomputer automatically stops the message tape during playback after all of the messages have been reproduced.

As an alternative, the control circuitry may cause a tone, or a sequence of tones, to be recorded on the magnetic tape, before the microcomputer is caused to initiate the rewind operation. The tone is sensed upon the subsequent forward motion playback of the magnetic tape, and when it is sensed the microcomputer stops the forward motion of the tape, and conditions the machine for another mode of operation, such as Automatic Answer, Standby, etc.

It will be appreciated that while particular embodiments of the invention have been shown and described, modifications may be made. It is intended in the claim to cover all modifications which come within the true spirit and scope of the invention.

What is claimed is:

1. In a telephone answering system which responds to telephone messages received over a telephone line and which includes a magnetic tape mechanism for recording messages received over the telephone line on a magnetic tape, the combination of: a microcomputer; manually operated local switch means connected to the microcomputer; circuit means connecting the microcomputer to the magnetic tape mechanism to cause the magnetic tape mechanism to rewind the magnetic tape in a reverse direction to a predetermined origin position when the switch means is manually operated; further circuit means connecting the microcomputer to the magnetic tape mechanism to cause the manetic tape mechanism to move the magnetic tape in the forward direction after it has reached said predetermined origin position; control circuitry connected to the microcomputer for enabling the microcomputer to stop the forward motion of the magnetic tape mechanism after it has returned to the position at which the switch means was manually operated; a sound transducer; and circuit means connecting the magnetic tape mechanism to the sound transducer to cause the sound transducer to reproduce the message recorded on the magnetic tape during the forward motion thereof.

2. The combination defined in claim 1, in which after the magnetic tape mechanism has returned to the position at which said manually operated switch means was operated and is stopped at that position by the microcomputer, the microcomputer switches the system to an automatic answer mode for answering and recording the next call received over the telephone line.

3. The combination defined in claim 1, in which said control circuitry is connected to said magnetic tape mechanism and receives pulses therefrom to be counted by said microcomputer whenever said magnetic tape mechanism is in motion to enable the microcomputer to stop the forward motion of the magnetic tape mechanism when it has returned to the position at which the manually operated switch means was operated.

4. The combination defined in claim 3, in which said circuitry reads a pre-recorded code from the magnetic tape via the tape mechanism prior to rewinding, said code representing the starting point before rewinding by the number of pulses received from the tape mechanism.

5. The combination defined in claim 1, in which said control circuitry is connected to said tape mechanism and causes at least one tone signal to be recorded on the magnetic tape when said manually operated switch means is operated and before commencing the rewind function, and in which said control circuitry senses the tone signal recorded on the tape upon the subsequent forward motion of the magnetic tape to cause the microcomputer to stop the forward motion of the magnetic tape mechanism when it has returned to the position at which the manually operated switch means was operated.

* * * * *

REEXAMINATION CERTIFICATE (762nd)
United States Patent [19]
Bond

[11] B1 4,558,179
[45] Certificate Issued  Sep. 22, 1987

[54] MESSAGE PLAYBACK CONTROL SYSTEM FOR TELEPHONE ANSWERING MACHINE

[75] Inventor: Raymond G. Bond, Long Beach, Calif.

[73] Assignee: Fortel Inc., Compton, Calif.

Reexamination Request:
No. 90/001,105, Sep. 30, 1986

Reexamination Certificate for:
Patent No.: 4,558,179
Issued: Dec. 10, 1985
Appl. No.: 527,978
Filed: Aug. 31, 1983

Disclaimer of claim(s) 1-5
Filed: Feb. 18, 1986 (1073 O.G.40)

[51] Int. Cl.[4] ............... H04M 1/65; G11B 15/00
[52] U.S. Cl. ............................. 379/70; 379/74; 360/74.1
[58] Field of Search ............... 179/6.01, 6.03, 6.07, 179/6.13, 6.11, 6.14; 360/55, 69, 71, 74.1, 74.4; 369/27, 47; 379/68, 70

[56] References Cited

U.S. PATENT DOCUMENTS

4,500,753  2/1985  Plunkett, Jr. ................. 379/70

OTHER PUBLICATIONS

"Code-A-Phone 1750" Preliminary Service Manual, Document No. 9970400, Copyright 1980, Ford Industries, Inc., Clackamas, Oregon.

*Primary Examiner*—Robert L. Richardson

[57] ABSTRACT

A message playback control system for a telephone answering machine of the type in which a user, in order to recover his messages, by operation of a manually operated local switch, causes the message tape in the machine to rewind to a particular position, and then causes the message tape to move in the forward direction and play back the messages recorded on the tape. The control system of the invention automatically causes the message tape to stop when all the messages have been played back, and then returns the machine to the automatic answer condition ready to answer the next telephone call.

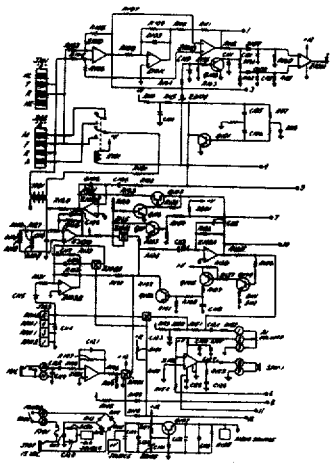

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–5 are now disclaimed.

* * * * *